US012299634B2

(12) United States Patent
Li

(10) Patent No.: US 12,299,634 B2
(45) Date of Patent: May 13, 2025

(54) METHOD, SYSTEM AND APPARATUS OF ORDER SCHEDULING AND ELECTRONIC DEVICE

(71) Applicants: Beijing Jingbangda Trade Co., Ltd., Beijing (CN); Beijing Jingdong Zhenshi Information Technology Co., Ltd., Beijing (CN)

(72) Inventor: Jianqi Li, Beijing (CN)

(73) Assignees: Beijing Jingbangda Trade Co., Ltd., Beijing (CN); Beijing Jingdong Zhenshi Information Technology Co., Ltd., Beijing (CN)

( * ) Notice: Subject to any disclaimer, the term of this patent is extended or adjusted under 35 U.S.C. 154(b) by 273 days.

(21) Appl. No.: 17/906,593

(22) PCT Filed: Jan. 25, 2021

(86) PCT No.: PCT/CN2021/073575
§ 371 (c)(1),
(2) Date: Sep. 16, 2022

(87) PCT Pub. No.: WO2021/196837
PCT Pub. Date: Oct. 7, 2021

(65) Prior Publication Data
US 2023/0132794 A1     May 4, 2023

(30) Foreign Application Priority Data
Mar. 31, 2020 (CN) .................. 202010247982.X

(51) Int. Cl.
*G06Q 10/00*     (2023.01)
*G06Q 10/0631*     (2023.01)
*G06Q 10/0875*     (2023.01)

(52) U.S. Cl.
CPC ... *G06Q 10/0875* (2013.01); *G06Q 10/06316* (2013.01)

(58) Field of Classification Search
CPC ................ G06Q 10/0875; G06Q 10/06316
See application file for complete search history.

(56) References Cited

U.S. PATENT DOCUMENTS

| 2021/0221613 A1 | 7/2021 | Liu et al. |
| 2021/0323800 A1 | 10/2021 | Liu et al. |
| 2023/0206174 A1* | 6/2023 | Li ................ B65G 1/1378 |
| | | 705/28 |

FOREIGN PATENT DOCUMENTS

| CA | 3101530 | 12/2019 |
| CN | 106311615 | 1/2017 |

(Continued)

OTHER PUBLICATIONS

First Chinese office action, issued in the corresponding Chinese Patent Application No. 202010247982.X, dated Mar. 9, 2023, 8 pages.

(Continued)

*Primary Examiner* — Rokib Masud
(74) *Attorney, Agent, or Firm* — HSML P.C.

(57) ABSTRACT

A method and an apparatus of order scheduling, an electronic device, and a computer-readable storage medium are provided. The method includes: determining a target buffer location from a plurality of shelf buffer locations of a workstation; acquiring shelf information of a plurality of shelves; acquiring a plurality of orders to be processed; determining a next shelf to be moved to the workstation based on the shelf information and the orders to be processed; outputting control information to move the shelf to the target buffer location (S250); and determining a part of orders to be processed from the plurality of orders to be (Continued)

processed as orders to be picked based on items carried on shelves moved to the plurality of shelf buffer locations.

18 Claims, 6 Drawing Sheets

(56) References Cited

FOREIGN PATENT DOCUMENTS

| CN | 107025533 | 8/2017 |
|---|---|---|
| CN | 109636269 | 4/2019 |
| CN | 109835651 | 6/2019 |
| CN | 110092122 | 8/2019 |
| CN | 111461547 | 7/2020 |
| JP | 2004-051301 | 2/2004 |
| JP | 2019-156560 | 9/2019 |
| JP | 2021-520329 | 8/2021 |
| WO | 2019/100644 | 5/2019 |
| WO | 2019/023348 | 12/2019 |
| WO | 2019/233484 | 12/2019 |

OTHER PUBLICATIONS

International Search Report, issued in the corresponding PCT Application No. PCT/CN2021/073575, dated Apr. 25, 2021, 6 pages.
First Japanese office action, issued in the corresponding Japanese Patent Application No. 2022-556218, dated Oct. 24, 2023, 7 pages.
Extended European Search Report (EESR) issued in the corresponding European Patent Application No. 21780346.9, dated Apr. 5, 2024, 9 pages.
Second Japanese Office Action issued in the corresponding Japanese patent Application No. 2022-556218, dated May 1, 2024, 4 pages with machine translation.
Second Chinese Office Action issued in the corresponding Chinese Patent Application 202010247982.X, dated Dec. 12, 2023.

* cited by examiner

METHOD, SYSTEM AND APPARATUS OF ORDER SCHEDULING AND ELECTRONIC DEVICE

CROSS-REFERENCE TO RELATED APPLICATION(S)

The present disclosure corresponds to PCT Application No. PCT/CN2021/073575, which claims priority to Chinese Patent Application No. 202010247982.X filed on Mar. 31, 2020, the content of which are incorporated herein by reference in their entireties.

TECHNICAL FIELD

The present disclosure relates to a field of warehousing and logistics, and in particular, to a method, a system and an apparatus of order scheduling, and an electronic device.

BACKGROUND

With a continuous development of e-commerce, people are more and more accustomed to buying goods online, which brings a great challenge to a warehousing and logistics system. How to complete picking and packaging more efficiently and deliver the goods to users through logistics has become an urgent problem to be solved.

In some warehouses, a shelf may be automatically moved to a workstation, and the staff may pick items from the shelf to an ex-warehouse container according to an order or collection order. After picking the items on a shelf, the shelf is moved back to its original position, and a new shelf is moved to the workstation, which may be repeated continuously. The ex-warehouse container is used to accommodate items of a collection order. Therefore, in this technology, a series of shelves need to be dispatched to the workstation according to the collection order, which may cause buffer locations in front of the workstation to be full, occupying a main road and causing congestion. A picking efficiency based on this scheduling method is low, thus a new method is needed to improve the picking efficiency.

SUMMARY

In view of the above, the present disclosure provides a method, a system and an apparatus of order scheduling, and an electronic device.

An aspect of the present disclosure provides a method of order scheduling, including: determining a target buffer location from a plurality of shelf buffer locations of a workstation; acquiring shelf information of a plurality of shelves, wherein the shelf information includes item information of items carried on each shelf of the plurality of shelves; acquiring a plurality of orders to be processed, including at least one unactivated order and at least one activated but uncompleted order; determining a next shelf to be moved to the workstation based on the shelf information and the orders to be processed; outputting control information to move the shelf to the target buffer location; and determining a part of orders to be processed from the plurality of orders to be processed as orders to be picked based on items carried on shelves moved to the plurality of shelf buffer locations. Optionally, the determining a target buffer location from a plurality of shelf buffer locations of a workstation includes: acquiring status information of the plurality of shelf buffer locations; and determining a shelf buffer location in an idle state from the plurality of shelf buffer locations as the target buffer location according to the status information.

Optionally, the determining a next shelf to be moved to the workstation based on the shelf information and the orders to be processed includes: determining a number of pickable items carried on each shelf of the plurality of shelves, wherein the pickable items includes items in the plurality of orders to be processed, or items in the activated but uncompleted order; determining a degree of urgency of the items carried on each shelf of the plurality of shelves; and determining the next shelf to be moved to the workstation from the plurality of shelves based on the number of the pickable items and the degree of urgency of the items.

Optionally, the degree of urgency of the items is determined based on a length of time to an order delivery deadline.

Optionally, the degree of urgency of the items is determined based on a completion degree of the activated but uncompleted order, wherein the completion degree is determined according to a ratio of a number of the items that have been picked to a total number of the items in the activated but uncompleted order.

Optionally, the determining a next shelf to be moved to the workstation based on the shelf information and the orders to be processed further includes: monitoring an order delivery deadline, and prioritizing an urgent order in a case that the order delivery deadline of the urgent order is smaller than a first threshold.

Optionally, the determining a part of orders to be processed from the plurality of orders to be processed as orders to be picked based on the items carried on the shelf moved to the plurality of shelf buffer locations includes determining a ratio of each order to be processed in the plurality of orders to be processed satisfied by the shelves currently in the plurality of shelf buffer locations as a coverage ratio, and determining one or more orders to be processed with the coverage ratio higher than a second threshold as the orders to be picked.

Optionally, the determining a part of orders to be processed from the plurality of orders to be processed as orders to be picked based on the items carried on the shelf moved to the plurality of shelf buffer locations includes determining one or more complex orders in the plurality of orders to be processed as the orders to be picked, wherein the complex order is an order with a number of categories of the items contained greater than a third threshold.

Optionally, the determining a part of orders to be processed from the plurality of orders to be processed as orders to be picked based on the items carried on the shelf moved to the plurality of shelf buffer locations includes determining a part of orders to be processed from the plurality of orders to be processed as the orders to be picked based on a length of time to an order delivery deadline.

Optionally, the outputting control information to move the shelf to the target buffer location includes sending the control information to a transfer robot to control the transfer robot to move the shelf to the target buffer location.

Optionally, the outputting control information to move the shelf to the target buffer location includes sending the control information to the shelf to control the shelf to move to the target buffer location.

Another aspect of the present disclosure provides an apparatus of order scheduling including: a first selection module, a first acquiring module, a second acquiring module, a determining module, an output module, and a second selection module. The first selection module is configured to determine a target buffer location from a plurality of shelf buffer locations of a workstation. The first acquiring module is configured to acquire shelf information of a plurality of shelves, wherein the shelf information includes item information of items carried on each shelf of the plurality of shelves. The second acquiring module is configured to acquire a plurality of orders to be processed, including at least one unactivated order and at least one activated but uncompleted order. The determining module is configured to determine a next shelf to be moved to the workstation based on the shelf information and the orders to be processed. The output module is configured to output control information to move the shelf to the target buffer location. The second selection module is configured to determine a part of orders to be processed from the plurality of orders to be processed as orders to be picked based on items carried on shelves moved to the plurality of shelf buffer locations. Optionally, the first selection module is specifically configured to: acquire status information of the plurality of shelf buffer locations; and determine a shelf buffer location in an idle state from the plurality of shelf buffer locations as the target buffer location according to the status information.

Optionally, the determining module is specifically configured to: determine a number of pickable items carried on each shelf of the plurality of shelves, wherein the pickable items includes items in the plurality of orders to be processed, or items in the at least one activated but uncompleted order; determine a degree of urgency of the items carried on each shelf of the plurality of shelves; and determine the next shelf to be moved to the workstation from the plurality of shelves based on the number of the pickable items and the degree of urgency of the items.

Optionally, the apparatus further includes: an ex-warehouse module, configured to determine at least one ex-warehouse container corresponding to the orders to be picked, and pick items by using the at least one ex-warehouse container.

Another aspect of the present disclosure provides an electronic device, including: at least one processor; and at least one memory configured to store one or more computer-readable instructions, wherein the one or more computer-readable instructions, when executed by the at least one processor, allow the processor to implement the method described above.

Another aspect of the present disclosure provides a computer-readable storage medium having computer executable instructions stored thereon, wherein the instructions are configured to, when executed, implement the method described above.

Another aspect of the present disclosure provides a computer program comprising computer executable instructions, wherein the instructions are configured to, when executed, implement the method described above.

BRIEF DESCRIPTION OF THE DRAWINGS

The above and other objectives, features and advantages of the present disclosure will be more apparent through the following descriptions of embodiments of the present disclosure with reference to the accompanying drawings.

DETAILED DESCRIPTION OF EMBODIMENTS

The embodiments of the present disclosure will be described below with reference to the accompanying drawings. It should be understood, however, that these descriptions are merely exemplary and are not intended to limit the scope of the present disclosure. In the following detailed descriptions, for purposes of explanation, numerous specific details are set forth in order to provide a thorough understanding of the embodiments of the present disclosure. It is obvious, however, that one or more embodiments may be implemented without these specific details. In addition, in the following descriptions, descriptions of well-known structures and technologies are omitted to avoid unnecessarily obscuring the concept of the present disclosure.

Terms used herein are for the purpose of describing embodiments only and are not intended to limit the present disclosure. Terms "comprising", "including" and the like used herein specify a presence of the feature, step, operation and/or component, but do not preclude a presence or addition of one or more other features, steps, operations or components.

All terms (including technical and scientific terms) used herein have the same meaning as commonly understood by those of ordinary skill in the art, unless otherwise defined. It should be noted that the terms used herein should be construed to have meanings consistent with the context of the present description and should not be construed in an idealized or overly rigid manner.

Where expressions like "at least one of A, B, and C, etc." are used, they should generally be interpreted in accordance with the meaning of the expression as commonly understood by those skilled in the art (e.g., "a system having at least one of A, B and C" should include, but not be limited to, a system having A alone, having B alone, having C alone, having A and B, having A and C, having B and C, and/or having A, B, C, etc.). Where expressions like "at least one of A, B, or C, etc." are used, they should generally be interpreted in accordance with the meaning of the expressions as commonly understood by those skilled in the art (e.g., "a system having at least one of A, B or C" should include, but not be limited to, a system having A alone, having B alone, having C alone, having A and B, having A and C, having B and C, and/or having A, B, C, etc.). Those skilled in the art should also understand that substantially any adversative conjunction and/or phrase denoting two or more optional items, whether in the description, claims or drawings, should be construed as giving possibilities of including one of the items, either of the items, or both items. For example, a phrase "A or B" should be understood to include possibilities of "A" or "B", or "A and B".

Figure 1:
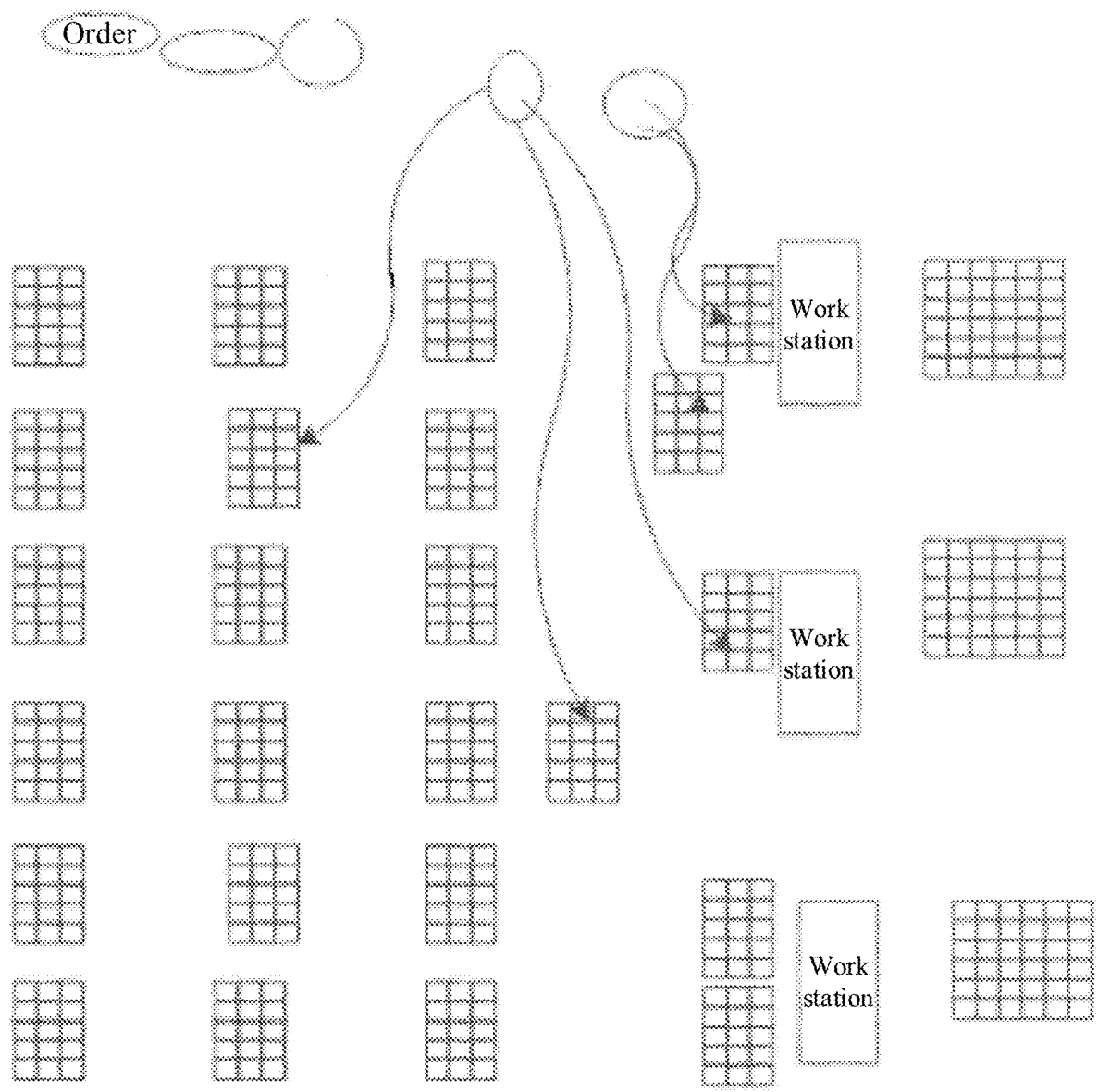
FIG. 1 schematically shows an application scenario of a method of order scheduling according to an embodiment of the present disclosure.

FIG. 1 schematically shows an application scenario of a method of order scheduling according to an embodiment of the present disclosure. It should be noted that FIG. 1 is only an example of an application scenario to which the embodiment of the present disclosure may be applied, so as to help those skilled in the art to understand the technical content of the present disclosure, but it does not mean that the embodiment of the present disclosure may not be applied to other devices, systems, environments or scenarios.

As shown in FIG. 1, a circle or oval symbol represents an order, a square symbol on a left side of a workstation represents a shelf, and a square symbol on a right side of the workstation represents an ex-warehouse container. In the related art, based on a collection order, a plurality of shelves are determined according to items required for a next order, and one of the shelves is moved to the workstation, and other shelves are moved to a buffer region. The staff of the workstation will pick up the items, and the items of a same collection order may be picked up to an ex-warehouse container.

Some trigger conditions may be set for the ex-warehouse container, and the ex-warehouse container may be delivered when the trigger conditions are met. These trigger conditions may be, for example, that the number of orders of multi-item orders in the ex-warehouse container is greater than 10, the number of orders of single-item orders is larger than 20, a slot in the ex-warehouse container is full, the number of items of a multi-item order is greater than 20, or a certain time limit is reached, etc.

However, this method tends to cause buffer locations in front of the workstation to be full, occupying the main road and causing congestion, and fewer items may be picked by moving the shelf each time, and the picking efficiency is low.

In this regard, the embodiments of the present disclosure provide a method of order scheduling, including determining a target buffer location from a plurality of shelf buffer locations of a workstation, acquiring shelf information of a plurality of shelves, wherein the shelf information includes item information of items carried on each shelf of the plurality of shelves, acquiring a plurality of orders to be processed, including at least one unactivated order and at least one activated but uncompleted order, determining a next shelf to be moved to the workstation based on the shelf information and the orders to be processed, outputting control information to move the shelf to the target buffer location; and determining a part of orders to be processed from the plurality of orders to be processed as orders to be picked based on items carried on shelves moved to the plurality of shelf buffer locations.

The embodiments of the present disclosure focus on a shelf, and subvert a picking method that focuses on an order. When a shelf buffer location of a workstation is in an idle state, a shelf is recommended. For example, a shelf on which more items may be picked out may be selected and moved to the workstation, which may effectively increase a number of the items picked from each shelf, thereby improving the picking efficiency. Different from a traditional order scheduling algorithm, in the embodiments of the present invention, the ex-warehouse container is basically not used as a constraint condition for scheduling orders. In this way, if necessary, the ex-warehouse container may be closed at any time to free up a new ex-warehouse container for a new order.

In the embodiments of the present disclosure, a trigger condition set for the ex-warehouse container may be, for example, that there is no open order in the container.

It should be understood that the number of orders, shelves, workstations and ex-warehouse containers in FIG. 1 is merely illustrative. There may be any number of orders, shelves, workstations and ex-warehouse containers according to implementation needs.

Figure 2:
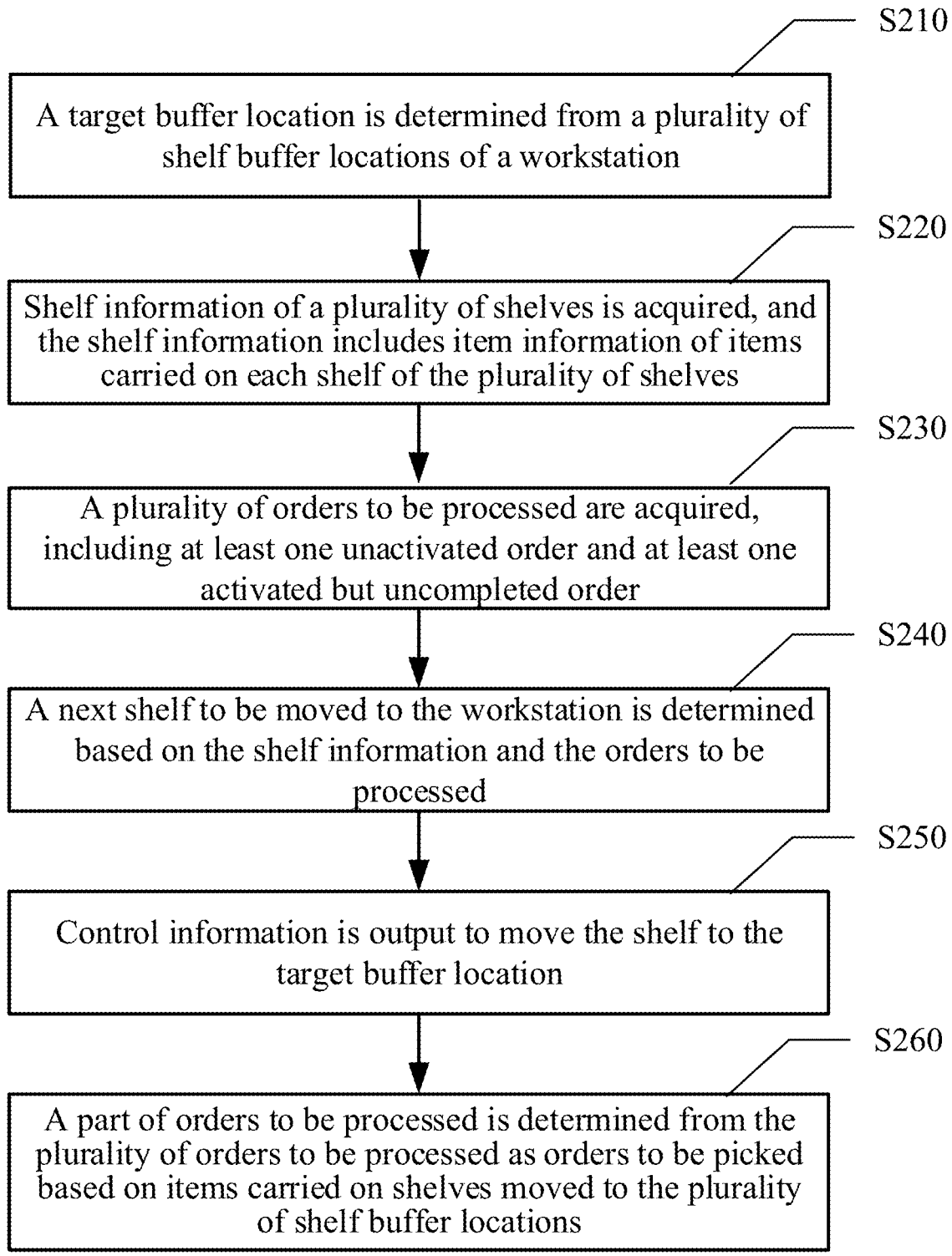
FIG. 2 schematically shows a flowchart of a method of order scheduling according to the embodiment of the present disclosure.

FIG. 2 schematically shows a flowchart of the method of order scheduling according to the embodiment of the present disclosure.

As shown in FIG. 2, the method includes operations S210 to S260.

In operation S210, a target buffer location is determined from a plurality of shelf buffer locations of a workstation.

According to the embodiments of the present disclosure, status information of the plurality of shelf buffer locations may be acquired, and a shelf buffer location in an idle state is determined from the plurality of shelf buffer locations as the target buffer location according to the status information.

In operation S220, shelf information of a plurality of shelves is acquired, and the shelf information includes item information of items carried on each shelf of the plurality of shelves.

In operation S230, a plurality of orders to be processed are acquired, including at least one unactivated order and at least one activated but uncompleted order.

According to the embodiments of the present disclosure, an activated but uncompleted order may also be referred to as an open order, or an opened order. Different from the related art, the method of the embodiments of the present disclosure does not pre-occupy the ex-warehouse container according to a pre-defined collection order, and allows a plurality of open orders to exist on one workstation at the same time. Therefore, the method of the embodiments of the present disclosure may take a plurality of unactivated orders and activated but uncompleted orders into account, so as to realize more efficient picking.

In operation S240, a next shelf to be moved to the workstation is determined based on the shelf information and the orders to be processed.

Since there is no pre-occupying of ex-warehouse containers, there is more freedom in selecting shelf and scheduling order. For example, a shelf on which more items may be picked out may be selected, which may effectively improve the picking efficiency.

For example, for shelf A, shelf B, and shelf C, the number of pickable items in shelf A is 5, the number of pickable items in shelf B is 7, and the number of pickable items in shelf C is 2, and it may be determined that shelf B is the next shelf to be moved to the workstation.

Figure 3:
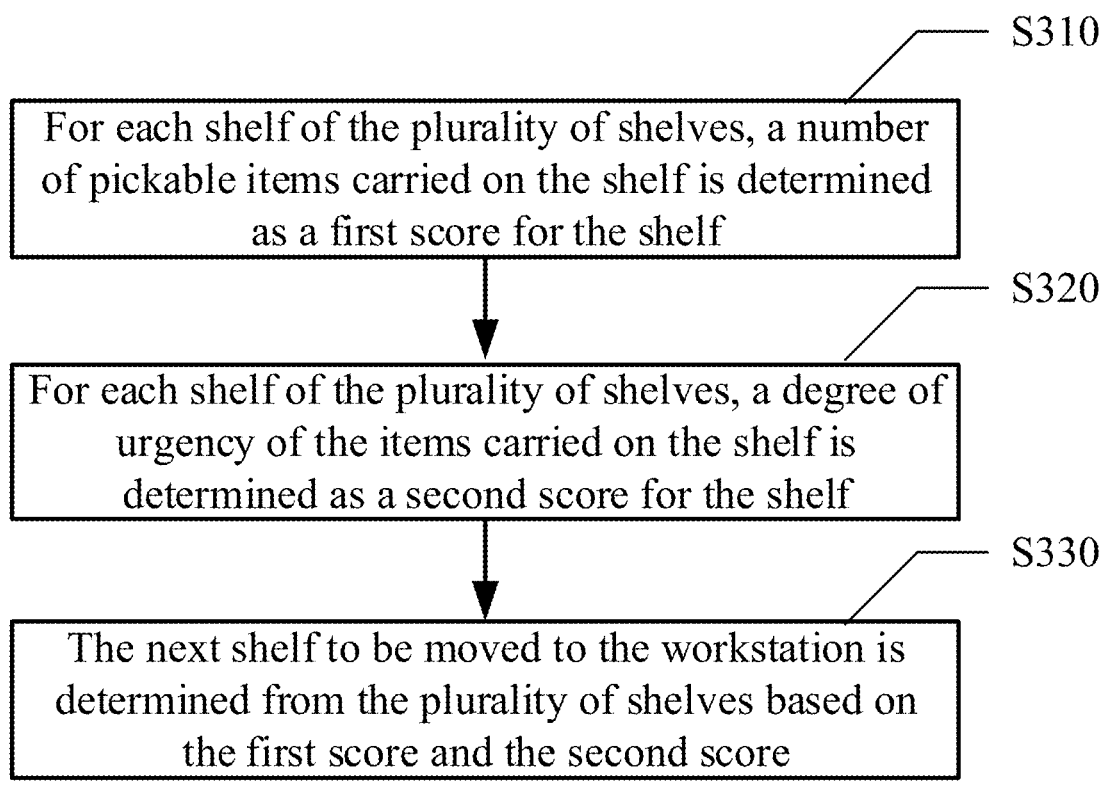
FIG. 3 schematically shows a flowchart of determining a next shelf to be moved to a workstation based on the shelf information and the orders to be processed according to the embodiment of the present disclosure.

FIG. 3 schematically shows a flowchart of determining a next shelf to be moved to a workstation based on the shelf information and the orders to be processed according to the embodiment of the present disclosure.

As shown in FIG. 3, the method includes operations S310 to S330.

In operation S310, for each shelf of the plurality of shelves, a number of pickable items carried on the shelf is determined as a first score for the shelf, wherein the pickable items include items in the plurality of orders to be processed, or items in the at least one activated but uncompleted order.

Generally, items to be picked for the orders to be processed are the pickable items. However, there may be exceptions. For example, the workstation may hold a limited number of ex-warehouse containers. When the number of the activated but uncompleted orders reaches a certain number, if the ex-warehouse containers are filled after completing these activated but uncompleted orders, then it is impossible to activate a new order. In this case, the pickable items are items required by the activated but uncompleted orders, and do not include items required by the unactivated orders.

For example, for shelf A, shelf B, and shelf C described above, a first score for shelf A is 5, a first score for shelf B is 7, and a first score for shelf C is 2. In order to integrate with a second score and make it easier to control contribution of the two scores to a final result, the first score may be determined after normalizing the number. In this case, the first score for shelf A is 5/14, the first score for shelf B is 1/2, and the first score for shelf C is 1/7.

According to the embodiments of the present disclosure, an inverted index of the items included in the order may be established, a corresponding order may be found according to a list of items included in the shelf, and then whether it is an order to be picked may be determined according to the method of S260 described below with reference to FIG. 4. The number of items included in the order to be picked may be determined, and the first score may be determined based on the number.

In operation S320, for each shelf of the plurality of shelves, a degree of urgency of the items carried on the shelf is determined as a second score for the shelf.

According to the embodiments of the present disclosure, the degree of urgency of the items may be determined based on a length of time to an order delivery deadline. Different degrees of urgency may be determined for different lengths of time to the delivery deadline of the order. As the remaining time shortens, the degree of urgency of the item increases. For example, a reciprocal of the remaining time may be set as the degree of urgency, and when the time to the order delivery deadline is 3 hours, 2 hours, 1 hour, 30 minutes, the degree of urgency may be determined as ⅓, ½, 1, 2. The results described above may also be normalized according to the longest time and the shortest time to the order delivery deadline, and the normalized results may be regarded as the degree of urgency.

According to the embodiments of the present disclosure, the degree of urgency of the items may be determined based on a completion degree of the activated but uncompleted order. For example, an order has been activated, that is, the order is in a state of being activated but not completed. The order requires a total of 5 items to be picked. Currently, 3 items have been picked, and the completion degree is 60%. If 4 items have been picked, the completion degree is 80%. The degree of urgency may be determined based on the completion degree. Simply, the completion degree may be directly used as the degree of urgency.

According to the embodiments of the present disclosure, the two degrees of urgency described above may be used independently to determine the second score, or may be used in combination to jointly determine the second score. For example, in a case that a length of time to a delivery deadline of an activated but uncompleted order is 1 hour, and a completion degree of the activated but uncompleted order is 80%, the degrees of urgency determined in the two ways may be normalized respectively, weighted and summed to acquire a second score.

In operation S330, the next shelf to be moved to the workstation is determined from the plurality of shelves based on the first score and the second score. For example, a final score may be determined by selecting the way of adding, weighted summing or multiplying the two scores. Based on the final score for each shelf, an optimal shelf is determined as the next shelf to be moved to the workstation.

According to the embodiments of the present disclosure, the determining a next shelf to be moved to the workstation based on the shelf information and the orders to be processed further includes monitoring the order delivery deadline, and prioritizing an urgent order in a case that the delivery deadline of the urgent order is smaller than a first threshold.

According to the embodiments of the present disclosure, the orders to be processed may include a time limited order different from an ordinary order, and the time limited order has a higher time limit requirement than the ordinary order. The method of the embodiments of the present disclosure may monitor a processing status of the time limited order independently, and after a certain time is reached, the time limited order may be forcibly processed, regardless of how many items required by other orders may be obtained from the shelf, so as to ensure that the time limited order is completed within a specified time limit.

Referring back to FIG. 2, in operation S250, control information is output to move the shelf to the target buffer location.

According to the embodiments of the present disclosure, outputting control information to move the shelf to the target buffer location includes sending the control information to a transfer robot to control the transfer robot to move the shelf to the workstation. The transfer robot may be, for example, an automated guided vehicle (AGV), and the AGV may be controlled to move the shelf to the target buffer location in the workstation.

According to the embodiments of the present disclosure, the outputting control information to move the shelf to the target buffer location includes sending the control information to the shelf to control the shelf to move to the target buffer location. In the embodiments of the present disclosure, a smart shelf may be used, and a bottom of the smart shelf may be provided with universal wheels, and may also include a communication device, a processor, and a driving device. When receiving control information through the communication device, the processor may parse the control information and generate a control signal to move the shelf to the target buffer location in the workstation through the driving device.

In operation S260, a part of orders to be processed is determined from the plurality of orders to be processed as orders to be picked based on items carried on shelves moved to the plurality of shelf buffer locations.

According to the embodiments of the present disclosure, the orders to be picked may be a collection order, which is used to characterize which orders are about to enter a picking process.

According to the embodiments of the present disclosure, the activated but uncompleted order in the orders to be processed may be regarded as the order to be picked.

According to the embodiments of the present disclosure, the order to be picked may be determined from the unactivated orders in various manners, which will be described separately below. It should be noted that the following manners may be used individually or in combination, which is not limited in the present disclosure.

For example, a ratio of each order to be processed in the plurality of orders to be processed satisfied by the shelves currently in the plurality of shelf buffer locations is determined as a coverage ratio, and one or more orders to be processed with the coverage ratio higher than a second threshold are determined as the orders to be picked. For example, the second threshold may be preset to 50%. When there is an order in the unactivated orders whose completion degree may exceed 50% by picking the items on the shelves currently docked at the workstation, in other words, when the items on the shelves docked at the workstation cover 50% of the order, the order may be determined as an order to be picked.

For another example, one or more complex orders in the plurality of orders to be processed may be regarded as the orders to be picked, the complex order is an order with a number of categories of the items contained greater than a third threshold. For example, the third threshold may be set to 3. When an order contains more than 3 categories of items, at least 3 shelves are required to meet a picking requirement of the order, and the order is determined as a complex order. If the current shelves may meet some of the items in the complex order, the complex order may be regarded as the order to be picked.

For another example, a part of orders to be processed from the plurality of orders to be processed may be determined as orders to be picked based on the length of time to the order delivery deadline. For example, in the case where an order is 3 hours, 2 hours, 1 hour, 30 minutes, etc. to the order delivery deadline, different degrees of urgency may be determined, and as the remaining time becomes shorter, the degree of urgency increases. A weight value may be determined according to the degree of urgency, so as to determine whether the order is determined as an order to be picked, or the order may be forcibly determined as an order to be picked when the time is less than a preset value.

According to the embodiments of the present disclosure, the method described above or other methods may be used to determine the weight value respectively, make a comprehensive evaluation, and then determine whether to determine the order as an order to be picked.

An original mode determines a shelf that needs to be transported to a workstation and a shelf buffer location corresponding to the shelf according to a pre-generated collection order. The shelf and shelf buffer location are occupied prematurely, which may cause buffer locations in front of a workstation to be full, occupying a main road and causing congestion, resulting in a low picking efficiency. The method of the embodiments of the present disclosure no longer schedules a shelf according to the pre-generated collection order, but comprehensively considers the unactivated order, the activated but uncompleted order and the shelf information to determine a shelf to be scheduled to the workstation buffer locations, and then determines an order to be picked, which may avoid pre-occupying resources such as shelves and shelf buffer locations or pre-occupy the resources at a late point, and improve a problem of low picking efficiency in the original mode.

In addition, the method of the embodiments of the present disclosure comprehensively considers the unactivated order, the activated but uncompleted order and the shelf information to jointly determine a shelf to be scheduled, which may increase an average number of picking pieces of the shelf and improve the picking efficiency. A main idea of the method of the embodiments of the present disclosure is to avoid pre-occupying any scheduling input or pre-occupy any scheduling input at a late point, including the order, the shelf, the ex-warehouse container, and the buffer location, which avoids a failure of expected scheduling order optimization caused by various anomalies, and at the same time, making late decisions is also conducive to accumulating more orders and optimizing other inputs in a timely manner.

According to the embodiments of the present disclosure, after the shelf is moved to the workstation, there may be a computer system or a display communicatively connected to a computer system on the workstation, which is used to prompt the staff which items to pick. It is also possible to set up a robotic arm instead of manual picking, so that the robotic arm may be directly controlled to perform picking without a display. The following describes a process of determining the item to be picked with reference to the embodiment shown in FIG. 4.

Figure 4:
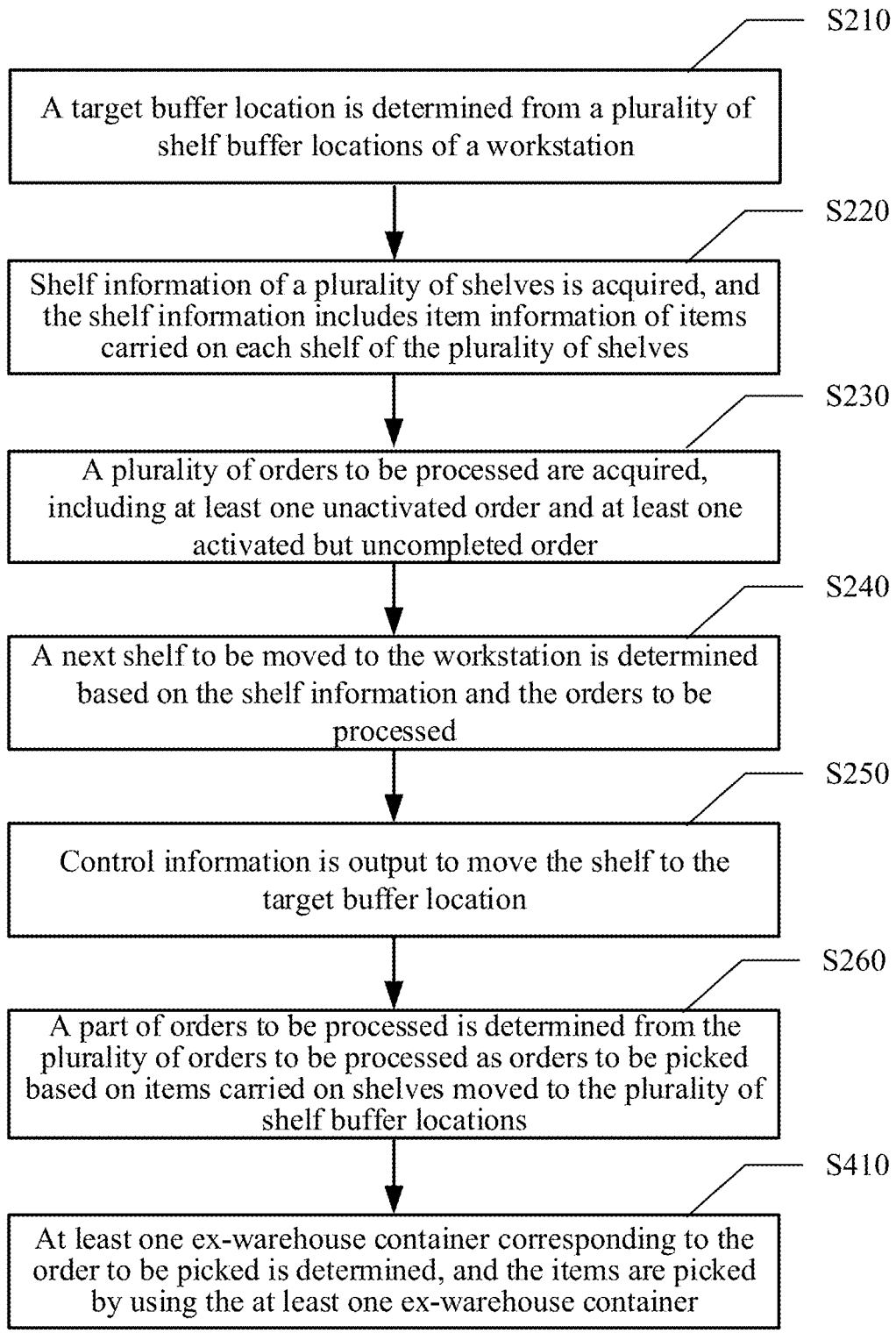
FIG. 4 schematically shows a flowchart of a method of order scheduling according to another embodiment of the present disclosure.

FIG. 4 schematically shows a flowchart of a method of order scheduling according to another embodiment of the present disclosure.

As shown in FIG. 4, on the basis of the embodiments described above, the method may further include operation S410.

In operation S410, at least one ex-warehouse container corresponding to the order to be picked is determined, and the items are picked by using the at least one ex-warehouse container.

According to the embodiments of the present disclosure, at least one ex-warehouse container may be allocated according to the type and number of the items in the order to be picked, and is used to load the items in the order to be picked during an ex-warehouse process.

According to the embodiments of the present disclosure, information of one or more items in the order to be picked may be displayed on a display, so that the staff may pick the items according to the information of the items, or the robotic arm may be controlled to grab one or more items indicated by the order to be picked into the ex-warehouse container.

According to the embodiments of the present disclosure, the ex-warehouse container is scheduled only after the order to be picked is determined, so that pre-occupancy of the ex-warehouse container may be avoided, thereby making the scheduling of the ex-warehouse container more flexible.

Based on the same inventive concept, the embodiments of the present disclosure further provide an apparatus of order scheduling, and the apparatus of order scheduling of the embodiments of the present disclosure will be described below with reference to FIG. 5.

Figure 5:
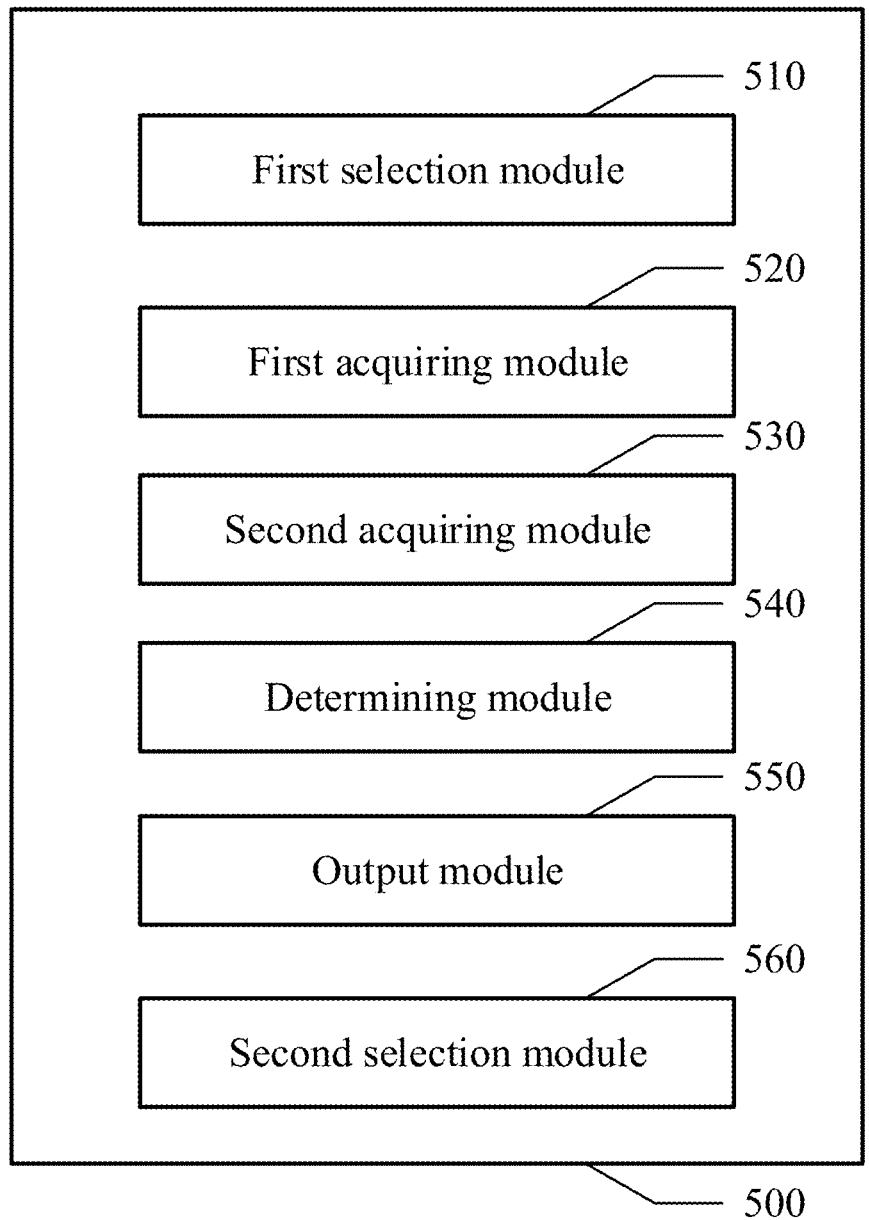
FIG. 5 schematically shows a schematic diagram of an apparatus of order scheduling according to the embodiment of the present disclosure.

FIG. 5 schematically shows a block diagram of an apparatus 500 of order scheduling according to the embodiment of the present disclosure.

As shown in FIG. 5, the apparatus 500 of order scheduling includes a first selection module 510, a first acquiring module 520, a second acquiring module 530, a determining module 540, an output module 550 and a second selection module 560. The apparatus 500 may perform various methods described above with reference to FIG. 2.

The first selection module 510, for example, performs operation S210 described above with reference to FIG. 2, for determining a target buffer location from a plurality of shelf buffer locations of a workstation.

The first acquiring module 520, for example, performs operation S220 described above with reference to FIG. 2, for acquiring shelf information of a plurality of shelves, wherein the shelf information includes item information of items carried on each shelf of the plurality of shelves.

The second acquiring module 530, for example, performs operation S230 described above with reference to FIG. 2, for acquiring a plurality of orders to be processed, including at least one unactivated order and at least one activated but uncompleted order.

The determining module 540, for example, performs operation S240 described above with reference to FIG. 2, for determining a next shelf to be moved to the workstation based on the shelf information and the orders to be processed.

The output module 550, for example, performs the operation S250 described above with reference to FIG. 2, for outputting control information to move the shelf to the target buffer location.

The second selection module 560, for example, performs the operation S260 described above with reference to FIG. 2, for determining a part of orders to be processed from the plurality of orders to be processed as orders to be picked based on items carried on shelves moved to the plurality of shelf buffer locations.

According to the embodiments of the present disclosure, the first selection module 510 may be used to acquire status information of the plurality of shelf buffer locations, and determine a shelf buffer location in an idle state from the plurality of shelf buffer locations as the target buffer location according to the status information.

According to the embodiments of the present disclosure, the determining module 540 may be used to, determine a number of pickable items carried on each shelf of the plurality of shelves, wherein the pickable items include items in the plurality of orders to be processed, or items in the at least one activated but uncompleted order, determine a degree of urgency of the items carried on each shelf of the plurality of shelves, and determine the next shelf to be moved to the workstation from the plurality of shelves based on the number of the pickable items and the degree of urgency of the items.

According to the embodiments of the present disclosure, the degree of urgency of the items is determined based on a length of time to an order delivery deadline.

According to the embodiments of the present disclosure, the degree of urgency of the items is determined based on a completion degree of the activated but uncompleted order, wherein the completion degree is determined according to a ratio of a number of the items that have been picked to a total number of the items in the activated but uncompleted order.

According to the embodiments of the present disclosure, the determining module 540 is further used to monitor an order delivery deadline, and prioritize an urgent order in a case that the order delivery deadline of the urgent order is smaller than a first threshold.

According to the embodiments of the present disclosure, the apparatus may further include at least one of a display module or an ex-warehouse module. The display module is used to display information of the one or more items based on the orders to be picked. The ex-warehouse module is used to determine at least one ex-warehouse container corresponding to the orders to be picked, and pick items by using the at least one ex-warehouse container.

According to the embodiments of the present disclosure, the second selection module 560 may be used to determine a ratio of each order to be processed in the plurality of orders to be processed satisfied by the shelves currently in the plurality of shelf buffer locations as a coverage ratio, and determine one or more orders to be processed with the coverage ratio higher than a second threshold as the orders to be picked.

According to the embodiments of the present disclosure, the second selection module 560 may be used to determine one or more complex orders in the plurality of orders to be processed as the orders to be picked, wherein the complex order is an order with a number of categories of the items contained greater than a third threshold.

According to the embodiments of the present disclosure, the second selection module 560 may be used to determine a part of orders to be processed from the plurality of orders to be processed as the orders to be picked based on a length of time to an order delivery deadline.

According to the embodiments of the present disclosure, the output module 550 may be used to send the control information to a transfer robot to control the transfer robot to move the shelf to the workstation.

According to the embodiments of the present disclosure, the output module 550 may be used to send the control information to the shelf to control the shelf to move to the workstation.

Any two or more of modules, sub-modules, units, sub-units, or at least part of the function of any two or more thereof according to the embodiments of the present disclosure may be implemented in one module. Any one or more of the modules, sub-modules, units, and sub-units according to the embodiments of the present disclosure may be divided into a plurality of modules for implementation. Any one or more of the modules, sub-modules, units, sub-units according to embodiments of the present disclosure may be implemented at least partially as a hardware circuit, such as a field programmable gate array (FPGA), a programmable logic array (PLA), a system on a chip, a system on a substrate, a system on a package, an application specific integrated circuit (ASIC), or may be implemented by any other reasonable means of hardware or firmware that integrates or packages a circuit, or may be implemented in any one of or a suitable combination of three implementation methods of software, hardware, and firmware. Alternatively, one or more of the modules, sub-modules, units, and sub-units according to the embodiments of the present disclosure may be implemented at least partially as a computer program module, which when executed, may perform a corresponding function.

For example, any two or more of the first selection module 510, the first acquiring module 520, the second acquiring module 530, the determining module 540, the output module 550, the second selection module 560, the ex-warehouse module and the display module may be combined into one module to be implemented or any one of the modules may be divided into a plurality of modules. Alternatively, at least part of the function of one or more of these modules may be combined with at least part of the function of other modules and implemented in one module. According to the embodiments of the present disclosure, at least one of the first selection module 510, the first acquiring module 520, the second acquiring module 530, the determining module 540, the output module 550, the second selection module 560, the ex-warehouse module and the display module may be implemented at least partially as a hardware circuit, such as a field programmable gate array (FPGA), a programmable logic array (PLA), a system on a chip, a system on a substrate, a system on a package, an application specific integrated circuit (ASIC), or may be implemented by any other reasonable means of hardware or firmware that integrates or packages a circuit, or may be implemented in any one of or a suitable combination of three implementation methods of software, hardware and firmware. Alternatively, at least one of the first selection module 510, the first acquiring module 520, the second acquiring module 530, the determining module 540, the output module 550, the second selection module 560, the ex-warehouse module and the display module may be implemented at least partially as a computer program module, which when executed, may perform a corresponding function.

Figure 6:
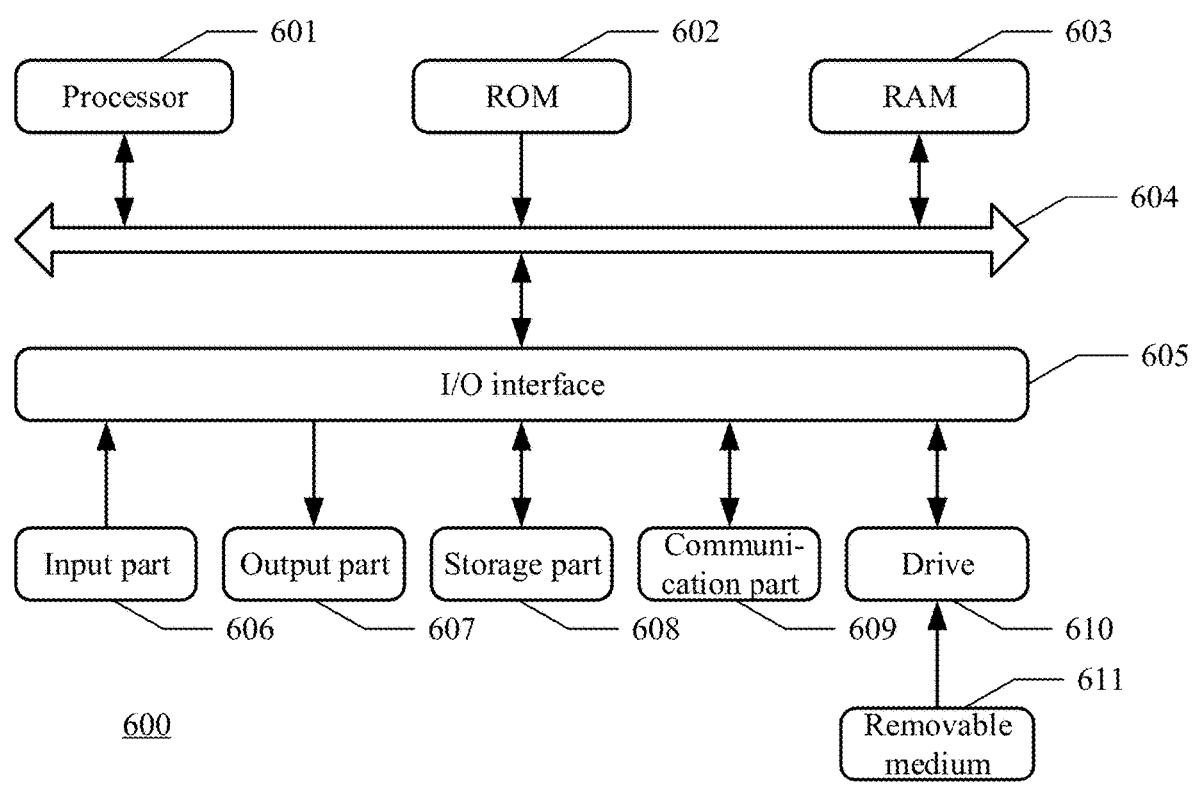
FIG. 6 schematically shows a block diagram of a computer system suitable for fulfilling an apparatus of order scheduling according to the embodiment of the present disclosure.

FIG. 6 schematically shows a block diagram of a computer system suitable for fulfilling a method and apparatus of order scheduling according to the embodiment of the present disclosure. The computer system shown in FIG. 6 is only an example, and should not impose any limitation on the function and scope of use of the embodiments of the present disclosure. The computer system shown in FIG. 6 may be implemented as a server cluster, which includes at least one processor (e.g., a processor 601) and at least one memory (e.g., a storage part 608).

As shown in FIG. 6, a computer system 600 according to the embodiments of the present disclosure includes the processor 601 that may perform various appropriate actions and processes according to programs stored in a read-only memory (ROM) 602 or programs loaded from the storage part 608 into a random access memory (RAM) 603. The processor 601 may include, for example, a general-purpose microprocessor (e.g., a CPU), an instruction set processor and/or a related chipset and/or a special-purpose microprocessor (e.g., an application-specific integrated circuit (ASIC)), etc. The processor 601 may also include an on-board memory for caching purposes. The processor 601 may include a single processing unit or a plurality of processing units for performing different actions of a method flow according to the embodiments of the present disclosure.

In the RAM 603, various programs and data required for the operation of the system 600 are stored. The processor 601, the ROM 602 and the RAM 603 are connected to each other through a bus 604. The processor 601 performs various operations of the method flow according to the embodiments of the present disclosure by executing the programs in the ROM 602 and/or the RAM 603. It should be noted that the programs may also be stored in one or more memories other than the ROM 602 and the RAM 603. The processor 601 may also perform various operations of the method flow according to the embodiments of the present disclosure by executing the programs stored in the one or more memories.

According to the embodiments of the present disclosure, the system 600 may also include an input/output (I/O) interface 605, and the input/output (I/O) interface 605 is also connected to the bus 604. The system 600 may also include one or more of the following components connected to the I/O interface 605: an input part 606 including a keyboard, a mouse, etc.; an output part 607 including a cathode ray tube (CRT), a liquid crystal display (LCD), etc., and a speaker, etc.; a storage part 608 including a hard disk, etc.; and a communication part 609 including a network interface card such as a LAN card, a modem, etc. The communication part 609 performs communication processing via a network such as the Internet. A drive 610 is also connected to the I/O interface 605 as needed. A removable medium 611, such as a magnetic disk, an optical disk, a magneto-optical disk, a semiconductor memory, etc., is mounted on the drive 610 as needed so that a computer program read therefrom is installed into the storage part 608 as needed.

According to the embodiments of the present disclosure, the method flow according to the embodiment of the present disclosure may be implemented as a computer software program. For example, the embodiment of the present disclosure includes a computer program product including a computer program carried on a computer-readable medium, and the computer program contains program code for performing the method illustrated in the flowchart. In such an embodiment, the computer program may be downloaded from the network via the communication part 609 and installed, and/or installed from the removable medium 611. The computer program, when executed by the processor 601, performs the functions described above defined in the system of the embodiments of the present disclosure. According to the embodiments of the present disclosure, the system, device, apparatus, module, unit, etc. described above may be implemented by the computer program module.

The present disclosure further provides a computer-readable medium. The computer-readable medium may be included in the device/apparatus/system described in the above-mentioned embodiments, and may also exist alone without being assembled into the device/apparatus/system. The computer-readable medium described above carries one or more programs, and when the one or more programs are executed, the method according to the embodiments of the present disclosure may be implemented.

According to the embodiments of the present disclosure, the computer-readable medium may be a computer-readable signal medium or a computer-readable storage medium, or any combination thereof. The computer-readable storage medium may be, for example, but not limited to, an electrical, magnetic, optical, electromagnetic, infrared, or semiconductor system, apparatus or device, or any combination of the above. More specific examples of the computer readable storage media may include, but are not limited to, an electrical connection with one or more wires, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination of the above. In the present disclosure, the computer-readable storage medium may be any tangible medium that contains or stores a program that may be used by or in conjunction with an instruction execution system, apparatus, or device. In the present disclosure, the computer-readable signal medium may include a data signal propagated in a baseband or as part of a carrier wave, which carries computer-readable program code. Such a propagated data signal may take a variety of forms, including but not limited to, an electromagnetic signal, an optical signal, or any suitable combination of the above. The computer-readable signal medium may also be any computer-readable medium other than the computer-readable storage medium, and the computer-readable medium may transmit, propagate, or transport a program that may be used by or in conjunction with the instruction execution system, apparatus, or device. Program code contained on the computer readable medium may be transmitted using any suitable medium including, but not limited to, a wireless, wired, optical fiber cable, radio frequency signal, etc., or any suitable combination of the above.

For example, according to the embodiments of the present disclosure, the computer-readable medium may include one or more memories other than the ROM 602 and/or the RAM 603 and/or the ROM 602 and the RAM 603 described above.

The flowchart and block diagrams in the drawings illustrate the architecture, functionality, and operation of possible implementations of systems, methods and computer program products according to various embodiments of the present disclosure. In this regard, each block in the flowchart or block diagrams may represent a module, program segment, or part of code, which contains one or more executable instructions for implementing the specified logical function. It should also be noted that, in some alternative implementations, the functions noted in the blocks may occur out of the order noted in the drawings. For example, two blocks shown in succession may, in fact, be executed substantially concurrently, or the two blocks may sometimes be executed in a reverse order, depending upon the functionality involved. It should also noted that each block of the block diagrams or flowchart illustrations, and combinations of the blocks in the block diagrams or flowchart illustrations, may be implemented by using a special purpose hardware-based system that performs the specified functions or operations, or may be implemented using a combination of a special purpose hardware and computer instructions.

Those skilled in the art will appreciate that features recited in the various embodiments of the present disclosure and/or the claims may be combined or/or incorporated in a variety of ways, even if such combinations or incorporations are not clearly recited in the present disclosure. In particular, the features recited in the various embodiments of the present disclosure and/or the claims may be combined and/or incorporated without departing from the spirit and teachings of the present disclosure, and all such combinations and/or incorporations fall within the scope of the present disclosure.

The embodiments of the present disclosure have been described above. However, these examples are for illustrative purposes only, and are not intended to limit the scope of the present disclosure. Although the various embodiments are described above separately, this does not mean that the measures in the various embodiments may not be advantageously used in combination. The scope of the present disclosure is defined by the appended claims and their equivalents. Without departing from the scope of the present disclosure, those skilled in the art may make various substitutions and modifications, and these substitutions and modifications should all fall within the scope of the present disclosure.

What is claimed is:

1. A method of picking items, implemented by a processor, the method, comprising:
    determining a target buffer location from a plurality of shelf buffer locations of a workstation;
    acquiring shelf information of a plurality of shelves, wherein the shelf information comprises item information of items carried on each shelf of the plurality of shelves;
    acquiring a plurality of orders to be processed, comprising at least one unactivated order and at least one activated but uncompleted order;
    determining a next shelf to be moved to the workstation based on the shelf information and the orders to be processed;
    outputting control information to move the shelf to the target buffer location;
    determining a part of orders to be processed from the plurality of orders to be processed as orders to be picked based on items carried on shelves moved to the plurality of shelf buffer locations; and
    determining at least one container corresponding to the orders to be picked, to pick items by using the at least one container and load items in the orders to be picked by the at least one container,
    wherein the outputting control information to move the shelf to the target buffer location comprises:
    sending the control information to a transfer robot to control the transfer robot to move the shelf to the target buffer location, the transfer robot comprises an automated guided vehicle; or
    sending the control information to the shelf to control the shelf to move to the target buffer location.

2. The method according to claim 1, wherein the determining a target buffer location from a plurality of shelf buffer locations of a workstation comprises:
    acquiring status information of the plurality of shelf buffer locations; and
    determining a shelf buffer location in an idle state from the plurality of shelf buffer locations as the target buffer location according to the status information.

3. The method according to claim 1, wherein the determining a next shelf to be moved to the workstation based on the shelf information and the orders to be processed comprises:
    determining a number of pickable items carried on each shelf of the plurality of shelves, wherein the pickable items comprise items in the plurality of orders to be processed, or items in the at least one activated but uncompleted order;
    determining a degree of urgency of the items carried on each shelf of the plurality of shelves; and
    determining the next shelf to be moved to the workstation from the plurality of shelves based on the number of the pickable items and the degree of urgency of the items.

4. The method according to claim 3, wherein,
    the degree of urgency of the items is determined based on a length of time to an order delivery deadline; and/or
    the degree of urgency of the items is determined based on a completion degree of the activated but uncompleted order, wherein the completion degree is determined according to a ratio of a number of items that have been picked to a total number of the items in the activated but uncompleted order.

5. The method according to claim 1, wherein the determining a next shelf to be moved to the workstation based on the shelf information and the orders to be processed further comprises:
    monitoring an order delivery deadline, and prioritizing an urgent order in a case that the order delivery deadline of the urgent order is smaller than a first threshold.

6. The method according to claim 1, wherein the determining a part of orders to be processed from the plurality of orders to be processed as orders to be picked based on the items carried on the shelf moved to the plurality of shelf buffer locations comprises at least one of:
    determining a ratio of each order to be processed in the plurality of orders to be processed satisfied by the shelves currently in the plurality of shelf buffer locations as a coverage ratio, and determining one or more orders to be processed with the coverage ratio higher than a second threshold as the orders to be picked;
    determining one or more complex orders in the plurality of orders to be processed as the orders to be picked, wherein the complex order is an order with a number of categories of the items contained greater than a third threshold; and/or
    determining a part of orders to be processed from the plurality of orders to be processed as the orders to be picked based on a length of time to an order delivery deadline.

7. An electronic device, comprising:
    a processor; and
    a memory having computer-readable instructions stored thereon, wherein the instructions, when executed by the processor, allow the processor to
    determine a target buffer location from a plurality of shelf buffer locations of a workstation;
    acquire shelf information of a plurality of shelves, wherein the shelf information comprises item information of items carried on each shelf of the plurality of shelves;

acquire a plurality of orders to be processed, comprising at least one unactivated order and at least one activated but uncompleted order;
determine a next shelf to be moved to the workstation based on the shelf information and the orders to be processed;
output control information to move the shelf to the target buffer location;
determine a part of orders to be processed from the plurality of orders to be processed as orders to be picked based on items carried on shelves moved to the plurality of shelf buffer locations; and
determine at least one container corresponding to the orders to be picked, to pick items by using the at least one container and load items in the orders to be picked by the at least one container,
wherein the processor is further configured to:
send the control information to a transfer robot to control the transfer robot to move the shelf to the target buffer location, the transfer robot comprises an automated guided vehicle; or
send the control information to the shelf to control the shelf to move to the target buffer location.

8. A computer-readable storage medium having computer-readable instructions stored thereon, wherein the instructions, when executed by a processor, allow the processor to
determine a target buffer location from a plurality of shelf buffer locations of a workstation;
acquire shelf information of a plurality of shelves, wherein the shelf information comprises item information of items carried on each shelf of the plurality of shelves;
acquire a plurality of orders to be processed, comprising at least one unactivated order and at least one activated but uncompleted order;
determine a next shelf to be moved to the workstation based on the shelf information and the orders to be processed;
output control information to move the shelf to the target buffer location;
determine a part of orders to be processed from the plurality of orders to be processed as orders to be picked based on items carried on shelves moved to the plurality of shelf buffer locations; and
determine at least one container corresponding to the orders to be picked, to pick items by using the at least one container and load items in the orders to be picked by the at least one container,
wherein the instructions, when executed by the processor, further allow the processor to:
send the control information to a transfer robot to control the transfer robot to move the shelf to the target buffer location, the transfer robot comprises an automated guided vehicle; or
send the control information to the shelf to control the shelf to move to the target buffer location.

9. The method according to claim 2, wherein the determining a next shelf to be moved to the workstation based on the shelf information and the orders to be processed further comprises:
monitoring an order delivery deadline, and prioritizing an urgent order in a case that the order delivery deadline of the urgent order is smaller than a first threshold.

10. The method according to claim 3, wherein the determining a next shelf to be moved to the workstation based on the shelf information and the orders to be processed further comprises:
monitoring an order delivery deadline, and prioritizing an urgent order in a case that the order delivery deadline of the urgent order is smaller than a first threshold.

11. The method according to claim 4, wherein the determining a next shelf to be moved to the workstation based on the shelf information and the orders to be processed further comprises:
monitoring an order delivery deadline, and prioritizing an urgent order in a case that the order delivery deadline of the urgent order is smaller than a first threshold.

12. The electronic device according to claim 7, wherein the processor is further configured to:
acquire status information of the plurality of shelf buffer locations; and
determine a shelf buffer location in an idle state from the plurality of shelf buffer locations as the target buffer location according to the status information.

13. The electronic device according to claim 7, wherein the processor is further configured to:
determine a number of pickable items carried on each shelf of the plurality of shelves, wherein the pickable items comprise items in the plurality of orders to be processed, or items in the at least one activated but uncompleted order;
determine a degree of urgency of the items carried on each shelf of the plurality of shelves; and
determine the next shelf to be moved to the workstation from the plurality of shelves based on the number of the pickable items and the degree of urgency of the items.

14. The electronic device according to claim 13, wherein,
the degree of urgency of the items is determined based on a length of time to an order delivery deadline; and/or
the degree of urgency of the items is determined based on a completion degree of the activated but uncompleted order, wherein the completion degree is determined according to a ratio of a number of items that have been picked to a total number of the items in the activated but uncompleted order.

15. The electronic device according to claim 7, wherein the processor is further configured to:
monitor an order delivery deadline, and prioritize an urgent order in a case that the order delivery deadline of the urgent order is smaller than a first threshold.

16. The electronic device according to claim 7, wherein the processor is further configured to perform at least one of:
determining a ratio of each order to be processed in the plurality of orders to be processed satisfied by the shelves currently in the plurality of shelf buffer locations as a coverage ratio, and determining one or more orders to be processed with the coverage ratio higher than a second threshold as the orders to be picked;
determining one or more complex orders in the plurality of orders to be processed as the orders to be picked, wherein the complex order is an order with a number of categories of the items contained greater than a third threshold; and/or
determining a part of orders to be processed from the plurality of orders to be processed as the orders to be picked based on a length of time to an order delivery deadline.

17. The electronic device according to claim 12, wherein the processor is further configured to:

monitor an order delivery deadline, and prioritize an urgent order in a case that the order delivery deadline of the urgent order is smaller than a first threshold.

18. The electronic device according to claim 13, wherein the processor is further configured to:
monitor an order delivery deadline, and prioritize an urgent order in a case that the order delivery deadline of the urgent order is smaller than a first threshold.

* * * * *